United States Patent
Nagata et al.

(10) Patent No.: US 7,396,427 B1
(45) Date of Patent: Jul. 8, 2008

(54) LAMINATING METHOD AND LAMINATING APPARATUS

(75) Inventors: Toru Nagata, Tokyo (JP); Kenji Suzuki, Kawasaki (JP); Teruaki Okuda, Tokyo (JP); Hiroshi Ochiai, Samukawa-machi (JP); Yoshinari Yasui, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1749 days.

(21) Appl. No.: 09/635,352

(22) Filed: Aug. 9, 2000

(30) Foreign Application Priority Data

Aug. 13, 1999 (JP) .................................. 11-229232
Aug. 13, 1999 (JP) .................................. 11-229233
Aug. 4, 2000 (JP) ............................. 2000-236906

(51) Int. Cl.
*B32B 37/14* (2006.01)
*B32B 37/16* (2006.01)
*B32B 37/26* (2006.01)
*B32B 38/10* (2006.01)
*B29C 65/48* (2006.01)
*B32B 38/18* (2006.01)

(52) U.S. Cl. ..................... 156/249; 156/230; 156/247
(58) Field of Classification Search ................ 156/247, 156/249

See application file for complete search history.

(56) References Cited

U.S. PATENT DOCUMENTS

| 3,985,602 | A | * | 10/1976 | Stuart ......................... 156/235 |
| 5,320,698 | A | * | 6/1994 | Fournier et al. ............. 156/159 |
| 6,095,220 | A | * | 8/2000 | Kobayashi et al. .......... 156/540 |
| 6,500,291 | B1 | * | 12/2002 | Okada et al. ................. 156/230 |
| 6,554,044 | B2 | * | 4/2003 | Paulson et al. .............. 156/540 |

FOREIGN PATENT DOCUMENTS

| JP | 58-224779 | 12/1983 |
| JP | 6-91767 | 4/1994 |
| WO | WO 93/15914 | 8/1993 |
| WO | WO 0015354 A1 * | 3/2000 |

* cited by examiner

*Primary Examiner*—Philip C Tucker
*Assistant Examiner*—Sonya Mazumdar
(74) *Attorney, Agent, or Firm*—Fitzpatrick, Cella, Harper & Scinto

(57) ABSTRACT

A laminating method for forming a laminated layer in the form of a transparent film on a surface of an image on a printed object includes the steps of transferring a laminate having a laminated layer and a heat resistive base material layer to the surface of the printed object for laminating to form a laminated printed object, and a rear edge peeling step of peeling off the heat resistive base material layer from a rear edge portion of the laminated printed object by exerting an active force on the rear edge of the printed object in the carrying direction. Subsequently to the rear edge peeling step, a front edge peeling step peels off the heat resistive base material layer from a front edge of the laminated printed object.

5 Claims, 7 Drawing Sheets

LAMINATING METHOD AND LAMINATING APPARATUS

BACKGROUND OF THE INVENTION

1. Field of the Invention

The present invention relates to a method for laminating a transparent film layer on the surface of images formed on a recording medium, and a laminating apparatus used for such method.

2. Related Background Art

There have been known the recording mediums having various compositions which are used for image formation by use of ink jet recording method. Then, along with the application range that has been made wider, and the performance that has been made higher for a recording apparatus (a printer) that uses ink jet method to output the electronic image information obtainable by a computer or through a network or to output the image information fetched by use of a digital camera, a digital video, a scanner, or the like, the performance of such recording media is required to be varied more in many more ways or to be made higher still.

For example, there has been known a method for forming an ink receiving layer by use of the ink jet recording method that adopts a recording medium provided with an ink receiving layer formed on a base material having porous inorganic particles of silica or alumina, and a binder such as water soluble resin as the main component thereof. With the composition thus arranged, it becomes possible to enhance the ink absorption and the fixation of coloring materials of ink.

Meanwhile, with an anticipation that the unit cost of image formation is reduced significantly if the ink jet recording method is made applicable to obtaining images whose quality is comparable to a color photography using silver salt or a multi-colored print using various printing methods, demands are also on the increase for the materialization of the technologies and techniques that make such ink jet printing possible.

As the technology and technique developed for the purpose to form a multi-colored image comparable to a silver salt photography or the one formed by the multi-color printing, there has been known those ones whereby to make the image quality higher by increasing the lustrous degree or smoothness of the image surface by laminating a transparent film layer on the surface of the ink receiving layer after images are formed by use of ink jet recording, and a recording medium composed on a base material together with white porous fine particles, such as silica, provided for the ink receiving layer thereof.

As an apparatus used for laminating the image surface, there is known the one disclosed in the specification of Japanese Patent Application Laid-Open No. 58-224779. For this apparatus, both the laminating material (member for laminating use) and a recording medium are supplied to the interior of the apparatus from a continuous sheet roller. Images are formed on a specific portion of the recording medium by use of ink jet method, and the member for laminating use is overlapped therewith and heated under pressure. Thus, after the transparent film layer is laminated on the recording medium, it is cut into a desired size to obtain the printed object which is made with the transparent film laminated on the image surface.

For the structure of the apparatus described above where both a member for laminating use and a recording medium are supplied into a laminating apparatus from a roller as the continuous sheets, there is an advantage that no positioning is needed when at least one of them is cut as sheet to be supplied.

However, a cutting process is required to out put a specific portion after the laminating process, and for that matter, unwanted cut pieces inevitably occur as discarded substance.

Further, with the conventional apparatus structured as described above, if a wide interval exists between adjacent two images formed on a recording medium, the area that requires no lamination is also laminated unnecessarily by the member for laminating use to be supplied as a continuous sheet. The use efficiency of the member for laminating use is made unfavorable in some cases.

As the structural example of a laminating apparatus that does not invite the creation of wasteful cut pieces due to the cutting process or the unfavorable use efficiency of the members used for laminating, Japanese Patent Application Laid-Open No. 06-91767 has been filed. In the specification of this Laid-Open Application, the surface protection layer of a leaf of a sheet having images formed on it, which is being laminated, is supported by a supporting member, and the surface protection layer is laminated when such lead of the sheet is carried into the apparatus. After that, the supporting member that has supported the laminating sheet is peeled off. In this way, only the leaf of the sheet having the lamination processed on it is obtained. The peel off of a supporting member from the leaf of a sheet is effectuated by the utilization of the leaf of the sheet itself whose "firmness" than the supporting member. After the laminating process, the carrying direction of the supporting member is changed at an acute angle to that of the leaf of the sheet. As a result, the leaf of the sheet does not follow the supporting member in its carrying direction so the front edge of the leaf of the sheet is peeled off from the supporting member. Then, the carrying process advances, the leaf of the sheet is caused to be peeled off from the supporting member.

Even by the adoption of this method, however, the peel off of the surface protection layer on the rear edge of the leaf of the sheet is not effectuated in good condition. The surface protection layer tends to remain like "fins" on the rear edge of the leaf of the sheet (that is, the surface protection layer remains irregularly), and appearance looks as if stained in some cases. The surface protection layer which remains irregularly spoils appearance, thus reducing the value of finished product. In order to eliminate this, there is a further need for a process to cut off such portion that may look like "fins" as a post process.

SUMMARY OF THE INVENTION

The present invention is designed with a view to solving the problems discussed above. It is an object of the invention to provide a laminating method and a laminating apparatus capable of making laminating process in higher quality and more efficiently by peeling off a laminating layer from a heat resistive base material after fixing the laminating layer held on the heat resistive base material to the surface of image on a printed object. Here, not only the front edge portion fixed to the surface of image on the printed object, but also, the rear edge portion thereof are peeled off positively to be separated reliably so that the creation of wasteful cut pieces are prevented, and also, the surface protection layer which appears like "fins" remaining on the rear edge portion of each leaf of sheets is eliminated.

It is another object of the invention to provide a laminating method and a laminating apparatus capable of enhancing the utilization efficiency of the laminate layer provided for the member for laminating use.

In order to achieve the aforesaid objects, the laminating method of the invention for forming a laminated layer in the form of a transparent film on the surface of image on a printed object by forming a laminated portion by overlapping with the printed object a member for laminating use provided with a laminating layer on heat resistive base material comprises the steps of transferring the laminated layer to a surface of image on a printed object for laminating; and peeling off from the heat resistive base material of the member for laminating use the rear edge portion of the printed object having the surface of image laminated with the transferred laminating layer of the member for laminating use by exerting active force on the rear edge of the printed object in the carrying direction having laminated thereon the laminating layer of the member for laminating use.

Also, in order to achieve the aforesaid objects, the laminating apparatus of the invention, which provides a laminating layer in the form of a transparent film for the surface of image on a printed object, comprises:

(a) carrying means for carrying a laminated element supplied to cover the surface of image on the printed object with the laminating layer of a member for laminating use having the laminating layer on heat resistive base material;

(b) means for transferring the laminating layer to the surface of image on the printed object for laminating;

(c) rear edge peeling off means for peeling off from the heat resistive base material of the member for laminating use the printed object having the laminating layer transferred thereto by exerting active force on the rear edge portion of the laminated element in the carrying direction having the laminating layer of the member for laminating use laminated on the surface of image; and (d) front edge peeling off means for peeling off from the heat resistive base material of the member for laminating use the printed object having the laminating layer transferred thereto by exerting active force on the front edge portion in the carrying direction.

Further, in order to achieve the aforesaid objects, the laminating method of the invention for forming a laminated layer in the form of a transparent film on the surface of image on a printed object by forming a laminated element by overlapping with the printed object a member for laminating use provided with a laminating layer on heat resistive base material comprises the steps of transferring the laminated layer to the surface of image on a printed object for laminating; peeling off from the heat resistive base material of the member for laminating use the rear edge of the printed object having the laminated layer transferred thereto by exerting active force on the rear edge portion of the printed object in the carrying direction having the laminating layer of the member for laminating use laminated on the surface of image thereon; peeling off from the heat resistive base material of the member for laminating use the front edge portion of the printed object having the laminating layer of the member for laminating use laminated on the surface of image thereon; and rewinding the edge portion of the laminating layer of the member for laminating use after the printed object is peeled off to the area for forming the laminated element having the member for laminating use overlapped with printed object.

Also, in order to achieve the aforesaid objects, the laminating apparatus of the invention, which provides a laminating layer in the form of a transparent film for the surface of image on a printed object, comprises:

(a) carrying means for carrying a laminated element supplied to cover the surface of image on the printed object with the laminating layer of a member for laminating use having the laminating layer on heat resistive base material;

(b) means for transferring the laminating layer to the surface of image on the printed object for laminating;

(c) rear edge peeling off means for peeling off from the heat resistive base material of the member for laminating use the printed object having the laminating layer transferred thereto by exerting active force on the rear edge portion of the laminated element in the carrying direction having the laminating layer of the member for laminating use laminated on the surface of image;

(d) front edge peeling off means for peeling off from the heat resistive base material of the member for laminating use the printed object having the laminating layer transferred thereto by exerting active force on the front edge portion in the carrying direction; and (e) rewinding and carrying means for rewinding the edge portion of the laminating layer of the member for laminating use after the printed object is peeled off to the area for forming the laminated element having the member for laminating use overlapped with printed object.

In accordance with the present invention, when laminating process is executed on the surface of image on a printed object, the laminating layer which is held on the heat resistive base material is in contact with the surface of image on the printed object under pressure, and after that, when the heat resistive base material is peeled off therefrom, only the needed portion of the laminating layer on the heat resistive base material is transferred to the surface of image on the printed object. Further, the separation is made reliably, positively, and effectively between the portion of the laminating layer which has been transferred to the printed object, and the portion which remains on the heat resistive base material, hence making it unnecessary to cut further the printed object and the member for laminating use in order to obtain a predetermined shape. As a result, no wasteful cut pieces are created. Moreover, with the rewinding and carrying processes after the laminating process executed for the member for laminating use, it becomes possible to enhance the utilization efficiency of the laminating layer for each of the printed objects.

DETAILED DESCRIPTION OF THE PREFERRED EMBODIMENTS

Figure 1:
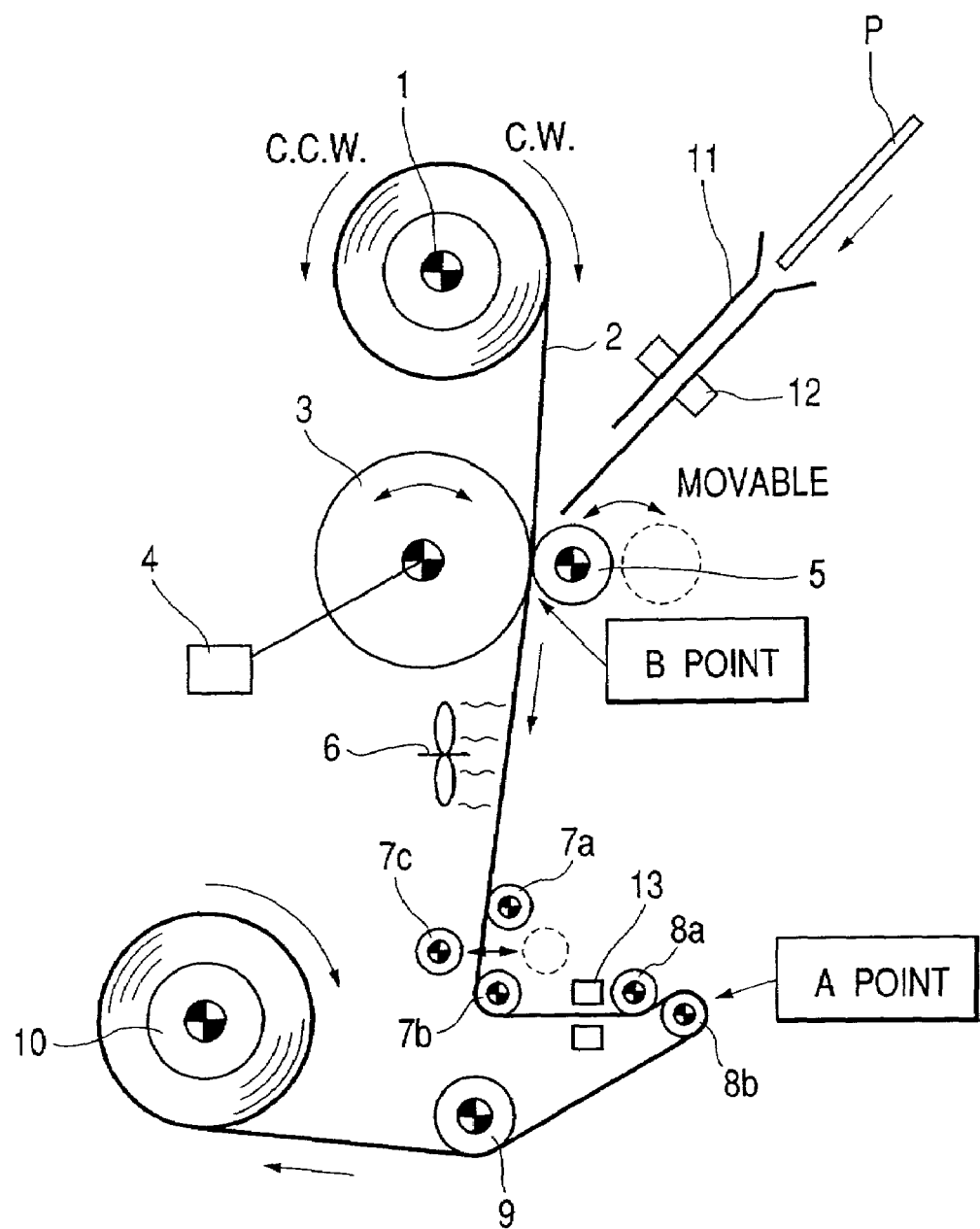
FIG. 1 is a view which schematically shows the one example of the principal part of a laminating apparatus in accordance with the present invention.

FIG. 1 is a view schematically showing one example of the laminating method and the principal part of a laminating apparatus to which the present invention is applicable. Now, hereunder, the description will be made in conjunction with FIG. 1.

The laminating apparatus shown in FIG. 1 is provided with a carrying mechanism for the member for laminating use which comprises an forwarding reel 1 that holds a roll having a member for laminating use 2 with the laminating layer formed on a heat resistive base material, which is a continuous sheet wound around the roller, and a winding reel 10 for wining the heat resistive base material from which the laminating layer is peeled off after having passed the laminating process. Between two reels 1 and 10, there are arranged, a printed object supply unit that supplies a cut sheet printed object P into the laminating apparatus; a laminating process unit that laminates the printed object P supplied from the supply unit and the member use for laminating 2 in order to heat and press them for laminating; a heat radiation unit to harden the laminated layer of the printed object P after the completion of the laminating process; a rear edge peeling off unit to peel off the rear edge of the laminated layer on the printed object P from the member for laminating use 2 in the carrying direction thereof; and a front edge peeling off unit to peel off the front edge of the laminate layer on the printed object P from the member for laminating use 2 in the carrying direction thereof, and at the same time, to peel off the laminate layer on the printed object P entirely from the member for laminating use 2.

Here, the forwarding reel 1 is structured to exert back tension on the member for laminating use 2 in the carrying direction thereof (direction indicated by an arrow CW in FIG. 1: clockwise direction) when it is sent out. In this respect, although described later, the member for laminating use 2 is formed to be carried forward from the forwarding reel 1 and the winding reel 10 sequentially or backward from the winding reel 10 to the forwarding reel 1 between the forwarding reel 1 and winding reel 10.

The printed object supply unit supplies a cut sheet printed object P having images formed on a specific surface of a recording medium into the apparatus through a supply guide 11. Then, it is arranged to be laminated on the member for laminating use 2 which is carried by means of the laminating member carrying mechanism. At this juncture, the surface of the printed object P having images formed thereon, and the laminating layer (not shown) of the member for use of laminating 2 are arranged to face each other when supplied, and the laminating portion is formed to be overlapped so as to the imaged surface is covered by the laminating layer. In this respect, the entire surface of the printed object P is arranged to be laminated with the laminating layer. Then, it becomes possible to arrange the front edge of the printed object P to be in agreement with the edge face of the laminating layer of the member for laminating use 2, as well as to minimize the wasteful use of the laminating layer.

In this state, the laminating member and printed object are supplied to the laminating process unit to enable it to pass a pair of rollers 3 and 5 serving as heating pressurizing means for laminating. The laminating layer on the heat resistive base material of the member for laminating use 2 is fused to the surface of images on the printed object P by the application of heat and pressure for laminating.

Here, this apparatus is structured so that the position of the roller 5 is made movable to that of the roller 3 relatively. Then, by shifting the roller 5, it is possible to adjust the gap between rollers to enhance the operability of carrying and supplying the printed object P and the member for laminating use 2 into the gap between rollers or to adjust the intensity of pressure. Also, the heating temperature and the intensity of pressure exerted by the pair of rollers 3 and 5 can be set appropriately depending on the composition and material of the printed object and member for laminating use to be used. For example, it is preferable to set pressure approximately at 7N/cm in terms of linear one.

Here, the printed object P and the laminated portion of the member for laminating use 2 are further carried by the rotation of the pair of rollers 3 and 5 to the heat radiating unit. For the apparatus shown in FIG. 1, the laminated portion is cooled positively by cooling means having a cooling fan 6 provided therefor. With this cooling, the laminating layer formed to be in a soften condition by heating is hardened to be fixed on the imaged surface. Here, the cooling means which is shown in FIG. 1 is to perform cooling by ventilating, but it may be possible to arrange various structures, such as natural cooling by carrying the laminated portion for a specific period of time after the laminating process by the application of heat and pressure, or positive cooling by carrying it through an area formed to provide a lower temperature (means like a cold storage, for instance), among some others.

Now, the cooled laminated portion is carried onto separation process (peeling off process) in order to separate (peel off) the printed object P from the member for laminating use 2. For the apparatus shown in FIG. 1, separation means comprises a pair of rollers 8a and 8b that form the front edge peeling off unit (front edge cutter) to peel off the front edge of the printed object P from the member for laminating use 2 in the carrying direction, and a group of rollers 7a, 7b, and 7c that form the rear edge peeling off unit (rear edge cutter) to peel off the rear edge of the printed object P from the member for laminating use 2 in the carrying direction.

In accordance with the structural example shown in FIG. 1, the separation of the printed object P from the member for laminating use 2 by separation means is executed in such a manner that at first, when the rear edge of the laminated portion arrives at the rear edge cutter, the rear edge portion is peeled off, and then, when the front edge of the laminated portion arrives at the front edge cutter, the front edge portion is peeled off, and that the laminated portion is further carried to peel it off from the front edge portion that has been already peeled off to the rear edge portion sequentially, hence peeling off the printed object P with the laminated portion from the heat resistive base material completely.

Figure 2A:
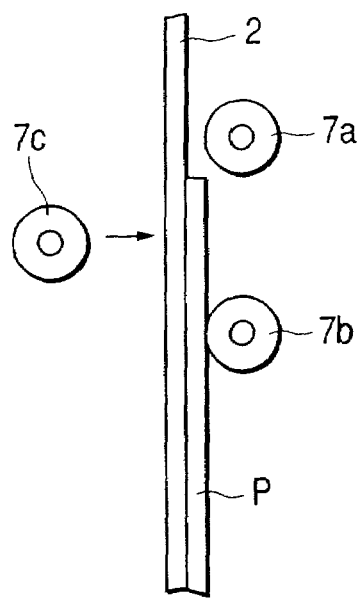
FIGS. 2A, 2B and 2C are views which schematically illustrate the rear edge separation process for the laminating apparatus in accordance with the present invention.
Figure 2B:
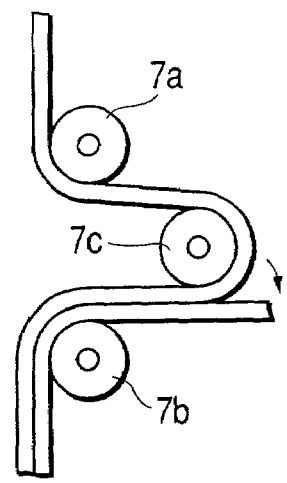

The rollers 7a and 7b of the rear edge cutter provided for the separation means are arranged to function as a fixed guide, and each of them is made rotative around each roller shaft. Also, the roller 7c forms the movable peeling off shaft. FIGS. 2A and 2B are views which schematically illustrate the peeling off process by means of these rollers. Here, for the FIGS. 2A and 2B, the representation of the laminating layer is omitted.

At first in FIG. 2A, when the rear edge of the laminated portion reaches the position where the rollers 7a, 7b, and 7c are installed, the roller 7c shifts to the space between the rollers 7a and 7b fixed as shown in FIG. 2B. Then, the rear edge of the laminated portion is displaced rapidly along with the movement of the roller 7c. Consequently, then, as shown in FIG. 2C, the rear edge portion of the printed object P is peeled off from the heat resistive base material 2a of the member for laminating use 2 together with the laminated layer 2b'.

This peeling off process can be attained by the utilization of difference in firmness of a printed object P and a heat resistive base material. In other words, if the firmness of the heat resistive base material is made smaller than that of the printed object, it becomes easier for the printed object P to be bent when the roller 7c is pushed in the space between the rollers 7a and 7b. Here, then, the heat resistive base material being bent more with greater ease, the rear edge of the printed object P is subjected to being peeled off from the surface of such curved portion of the heat resistive base material.

For the peeling performance, not only the firmness of materials to be used, but also, the following can be mentioned as factors that may influence the peeling capability: the peeling power of the heat resistive base material against the laminated layer; the bending degree of the rear edge of the laminated portion by use of the roller 7c; the environmental temperature at the time of peeling off; and the speed at which peeling off is executed (the speed of displacement, the speed of carrying members).

Figure 2C:
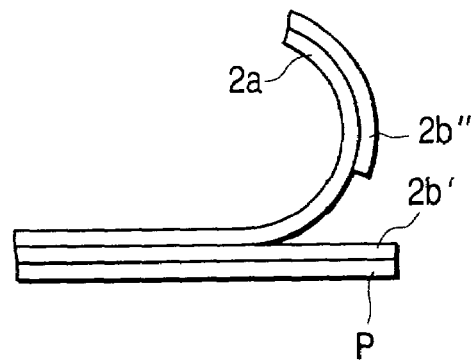

Also, as shown in FIG. 2C, the laminated layer is automatically and effectively divided in the separation process into the portion 2b' to be transferred to the printed object P side and the remaining portion 2b" on the heat resistive base material 2a side. Here, the number of rollers that form the rear edge cutter, and the positional relations between them and operation, among some others, can be selected appropriately for the achievement of peeling off on the rear edge portion. For example, it may be possible to arrange the structure so that the rollers 7a and 7b are made movable, while the roller 7c is fixed.

Figure 3A:
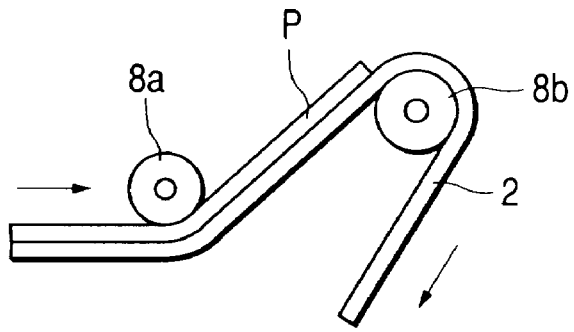
FIGS. 3A and 3B are views which schematically illustrate the front edge separation process for the laminating apparatus.
Figure 3B:
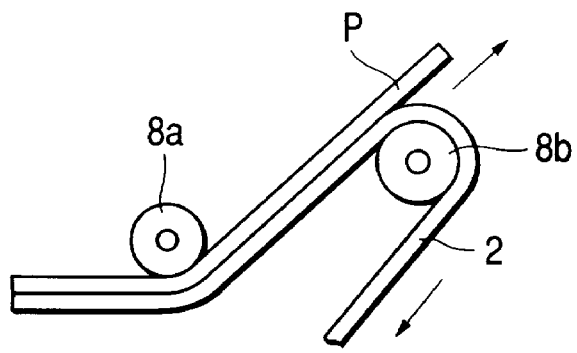

Meanwhile, the rollers 8a and 8b of the front edge cutter are arranged to function as the fixed guides that form the front edge peeling off mechanism. Both of them are made rotative centering on the roller shafts, and create displacement in the carrying direction (moving direction) of the printed object P and heat resistive base material. These rollers are fixed with the positional relationship so as to carry them in the directions different from each other. FIGS. 3A and 3B are views which illustrate the peeling off process in the front edge portion. As shown in FIGS. 3A and 3B (here, the laminated layer is also omitted), when the laminated portion of the front edge passed the gap between these rollers in the peeling off process, the carrying direction of the member for laminating use 2 is caused to change toward the winding reel 10 by the presence of the roller 8b, while the printed object P moves in the direction regulated by the rollers 8a and 8b. The peeling off thus beginning with the front edge of the laminated portion is caused to advance toward the rear edge portion which has been already peeled off. To this peeling off, the difference in the firmness, peeling power, and degree of curb between the printed object P and heat resistive base material is suitably applicable as in the case of the rear edge peeling off described above. At this junction, as shown in FIG. 2C, it becomes possible to cut the laminated layer automatically and effectively.

Figure 6A:
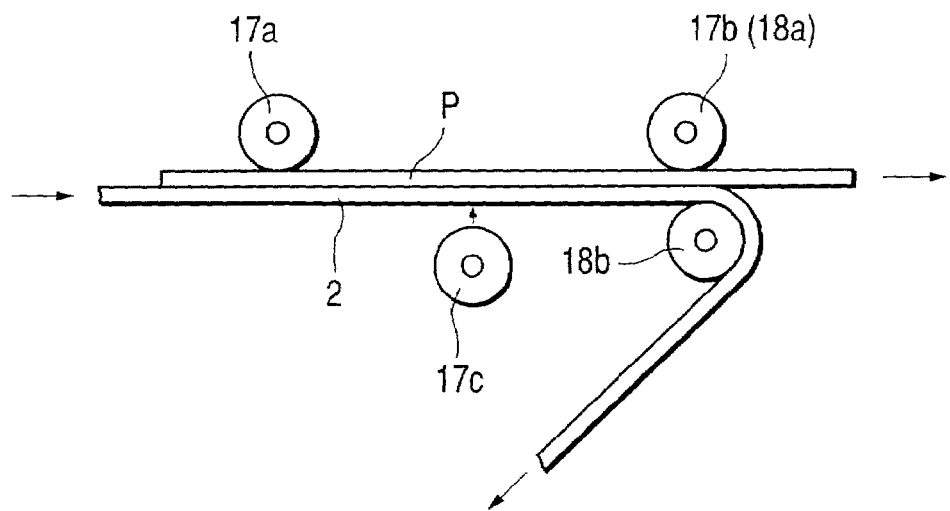
FIGS. 6A and 6B are views which schematically illustrate another example of the front edge and rear edge separation processes by a laminating apparatus in accordance with the present invention.
Figure 6B:
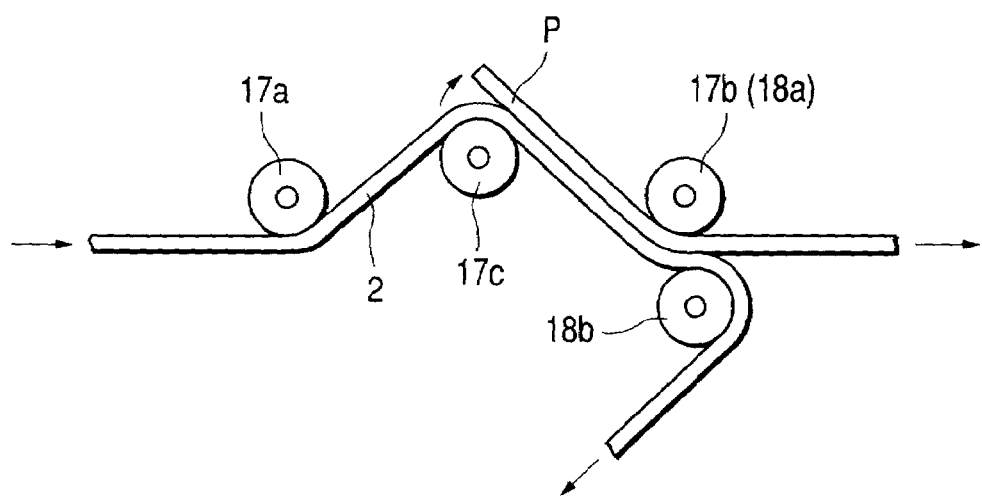

FIGS. 6A and 6B are views which illustrate the structural example of another apparatus to which the present invention is applicable. FIGS. 6A and 6B represent only the portion where the peeling off process is executed to peel off the laminate-layered printed object P, which is taken out from the laminated portion of the member for laminating use 2 and printed object P. To all the other structures, those shown in FIG. 1 are equally applicable.

For the structural example shown in FIGS. 6A and 6B, one structure is materialized by arranging the structure of the rear edge peeling off and that of the front edge peeling off shown in FIG. 1 to be located as close as possible.

In other words, rollers 17a, 17b, and 18b are provided fixedly one after another in that order form the upstream side of the member for laminating use 2 and printed objected P in the carrying direction thereof indicated by arrows, and a roller 17c is arranged movably between the rollers 17a and 17b fixedly provided. Here, the rollers 17a, 17b, and 18b correspond to the rollers 7a, 7b, and 8b shown in FIG. 1 functionally. Also, the roller 17b may be conceivable as being designated by a reference numeral 18a as shown in FIG. 6A.

As shown in FIG. 6A, when the front edge of the laminated portion of the member for laminating use 2 and printed object P has passed the roller 18b, the front edge of the laminate-layered printed object P is in a state of being peeled off from the heat resistive base material. At this juncture the rear edge of the laminated portion is yet to arrive at the roller 17a. Further, as shown in FIG. 6B, when carrying advances in the direction indicated by arrows, the rear edge of the laminated portion arrive in a location between the rollers 17a and 17b. In this sate, the roller 17c is actuated to move so that the laminated portion between the member for laminating use 2 and printed object P is displaced to cause the rear edge of the laminated portion is peeled off as in the case shown in FIG. 1.

In other words, as shown in FIG. 1, and FIGS. 6A and 6B, the structure of the apparatus of the present invention is formed so as to arrange the rear edge portion peeling off mechanism on the upstream side of the carrying direction of the member for laminating use 2 and printed object P, and the front edge portion peeling off mechanism on the downstream side of the carrying direction thereof. However, as processes, whereas it is arranged for the one shown in FIG. 1 that the front edge portion is peeled off after the rear edge portion has been peeled off, the one shown in FIGS. 6A and 6B is arranged to peel off the front edge portion, and then, to peel off the rear edge portion. For the structure shown in FIG. 1, too, the arrangement relation becomes the same as the one shown in FIGS. 6A and 6B if the length of a printed object P is larger than the positional interval between the front edge cutter and rear edge cutter. In either structure and process, the peeling process is executable in good condition, but the structure shown in FIGS. 6A and 6B may contribute more to the miniaturization of the structure of the apparatus itself.

Also, it may be possible to omit the provision of the rear edge cutter described earlier. In this case, the rear edge cutting is executed in such a manner that an eccentric cam roller is provided at the end of the peeling off process by the front edge cutter so as to the printed object P is rapidly peeled off from the member for laminating use.

For the member for laminating use 2 on the upstream side of the carrying direction after the printed object P has been peeled off from the member for laminating use 2, the laminating layer exits on the heat resistive base material in a state of being yet to be used. Then, it may be possible to carry out a laminating process by the same operation as described above by returning such member for laminating use 2 by the reverse rotation of the reel 1 shown in FIG. 1 (in the direction indicated by an arrow CCW in FIG. 1: counterclockwise direction) so that the front edge of the laminating layer yet to be used, which exists on the heat resistive base material, is rewound to the laminating location of a new printed object. In this manner, the laminating layer is rewound in order to minimize the wasteful use thereof. When the laminating process is completed, the member for laminating use 2 is wound up by the winding reel 10 lastly.

Figure 4:
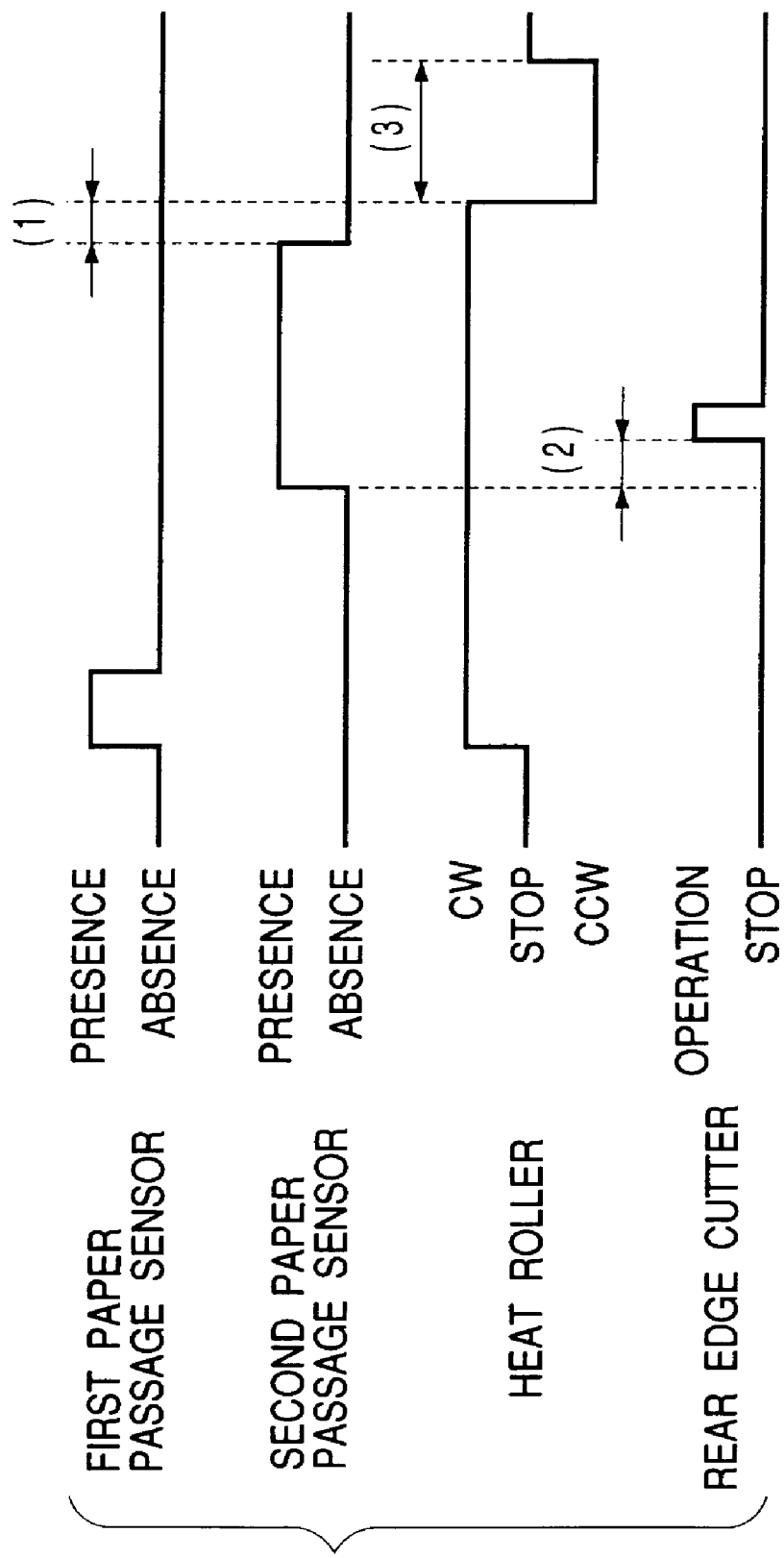
FIG. 4 is a view which shows the relationship the driving pulses and the driving operation of each part when the laminating apparatus represented in FIG. 1 is automatically controlled.

As shown in FIG. 1, it is possible to control the laminating process described above automatically by the utilization of detection means which comprises the photo-interrupter 12 that forms a first paper passage sensor; the photo-interrupter 13 that forms a second paper passage sensor; the rotary encoder 4 which is coaxially connected with the heat roller 3, and some others. As shown in FIG. 4, for example, the automatic laminating process becomes possible by detecting the operation of each unit by each of the detection means in accordance with the driving pulses thereof so as to control each operation therefor. Here, for the structure shown in FIG. 4, it is assumed that the printed object is one whose size is fixed and known in advance.

In FIG. 4, a numeral 1 in parenthesis designates a pulse portion required for a printed object is completely exhausted after the printed objected has passed the printed object has passed the paper passage sensor 13 (the distance between the paper passage sensor 13 and the front edge cutter is fixed, while the length of the printed object has been known, thus making it possible to calculate such portion with the detection of the rear edge of the printed object by the sensor 13). A numeral 2 in parenthesis designates the pulse numbers equivalent to the amount of carriage required from the detection of the front edge of the printed object by means of the paper passage sensor 13 to the arrival of the rear edge of the printed object at the rear edge cutting portion (the distance between the paper passage sensor 13 and the rear edge cutter is fixed, while the length of the printed object has been known, thus making it possible to calculate such portion with the detection of the front edge of the printed object by the sensor 13). Also, a numeral 3 in parenthesis designates the numbers of pulses required for rewinding the laminating layer yet to be used from the point A which is a point at which the front edge cutting is executed in FIG. 4 to the point B that indicates the point at which the printed object and the member for laminating use are laminated.

At first, the printed object P of a regular size is inserted into the guide 11. Then, with the signal generated by the first paper passage sensor 12 to indicate the "presence" of sheet, the pressure roller 5 moves toward the heating roller 3 to keep them in contact under pressure. Thus, the heating roller 3 begins to rotate. At this juncture, since the printed object P is inserted into the guide 11 at an unspecific speed in accordance with the present embodiment, the first paper passage sensor 12 functions to detect only the timing which is required for the movement of the pressure roller 5. The portion of the continuous sheet member for laminating use, where the printed object P is positioned, is pressured by the pair of rollers 3 and 5 while being heated. This state exits continuously until the second paper passage sensor 13 detects the "presence" of the sheet. The rotary encoder 4 connected with the heating roller 3 monitors the positional angle of the heating roller 3 corresponding to the carrying length of the member for laminating use which serves as a continuous sheet at the time of detection of the "presence" of the sheet by the second paper passage sensor 13 (with the regulated size of the printed object, the amount of carnage is constant from the detected position of "presence" of the sheet by the second paper passage sensor 13 to the position of the rear edge cutter). Then, by use of the roller 7c that forms the rear edge peeling off axis, the rear edge peeling off is executed at the angle thus monitored. Therefore, the pressurized heating roller pair 3 and 5, the rear edge cutter, and the second paper passage sensor 13 are arranged at the positional relationship which makes the rear edge peeling off possible as described here.

After that, until the second paper passage sensor 13 detects the "absence" of sheet, the laminated portion is carried to the front cutter unit. Then, the pealing off from the front edge is sequentially executed by carrying the laminated portion, and when the peeling off reached the rear edge portion which has been already peeled off, the laminate-processed printed object is drawn out. In this operation, when the second paper passage sensor 13 detects the "absence" of the sheet, the member for laminating use is carried for a portion equivalent to the length required for the complete exhaust of the printed object from the interior of the apparatus. This is carried out by monitoring the rotation of the heating roller 3 by use of the rotary encoder 4 for the portion equivalent to the distance from the position where the rear edge of the printed object has passed the second paper passage sensor 13 to the position where the printed object P is exhausted (with the size of the printed object being regulated, the amount of carriage from the detection of the second paper passage 13 of the "absence" of the sheet to the exhaust thereof is constant). At this juncture, since the printed object P passes the front edge peeling off mechanism, the laminated layer which is adhesively bonded to the printed object whose firmness is higher cannot pass the same path as the member for laminating use (heat resistive base material) in the passage which is abruptly bent as described earlier, thus the peel off thereof being effectuated. Now that the rear edge has been already peeled off, the printed object is entirely peeled off effectively without cutting the laminating layer of the member for laminating use any further.

Figure 5:
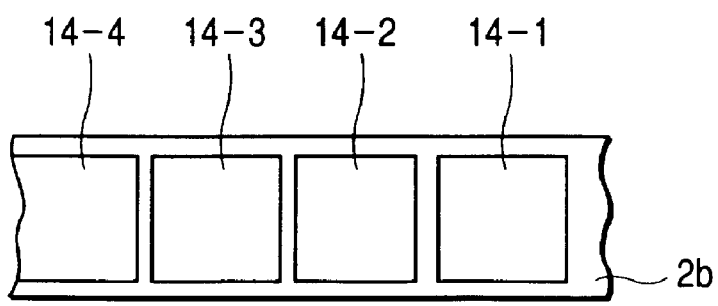
FIG. 5 is a view which shows the positional example of the utilizing condition of the laminating layer as the arrangement area for a printed object.

In this respect, the laminating layer on the member for laminating use is heated between the positions where the roller 3 is installed and the front edge peeling off mechanism is arranged, but it is made reusable if the layer is formed by thermoplastic resin. Here, the portion of laminating layer yet to be used that follows in the carrying direction on the arrangement area of the peeled off printed object (that is, the portion that begins at 2b" in FIG. 2C, for instance) should be rewound to the arrangement position of printed object. To the end, the heating roller 2 rotates CCW direction by the angle corresponding to the required length for the rewinding carriage, and then, this rotation is suspended. After rotation is suspended, the movable pressure roller 5 is again retracted to the non-contact pressuring position. The portion yet to be used, which is adjacent to the used portion of the laminating layer, thus reversely carried, is made a new arrangement area for the laminating process of a new printed object by the execution of the processes described above. For example, then, as shown in FIG. 5, it becomes possible to enhance the utilization efficiency of laminating layer by arranging the arrangement areas of printed objects 14-1 to 14-4 side by side efficiently with respect to the laminating layer 2b.

Here, when using a new roll of member for laminating use, the portion initially drawn out therefrom is formed by the leader portion where no laminating layer is provided. Then, it is preferable to arrange the structure so that the laminating process begins when the front edge of the laminating layer arrives at the arranging means of a printed object after the leader portion has been drawn out.

Figure 7:
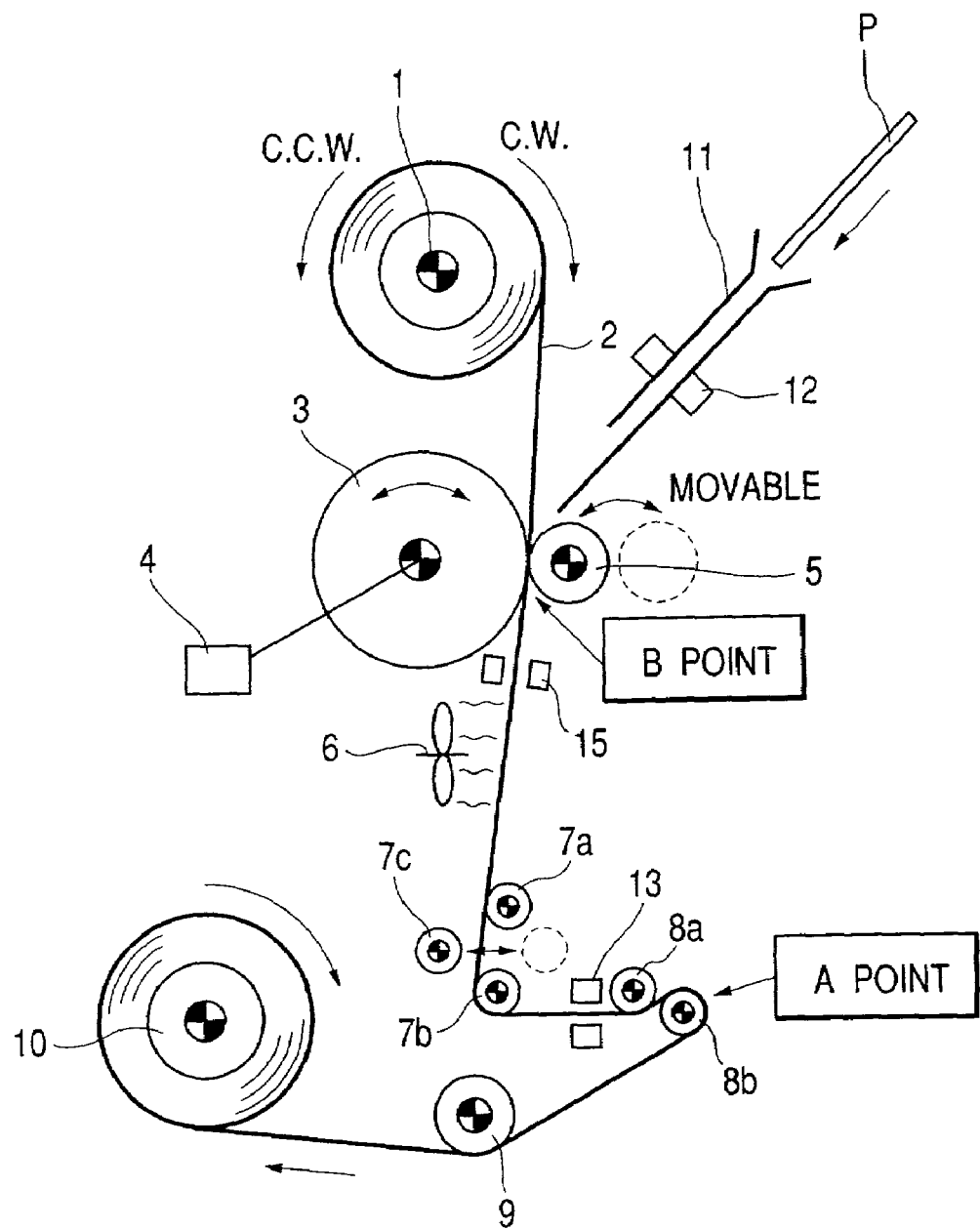
FIG. 7 is a view which schematically shows the principal part of a laminating apparatus in accordance with another embodiment of the present invention.
Figure 8:
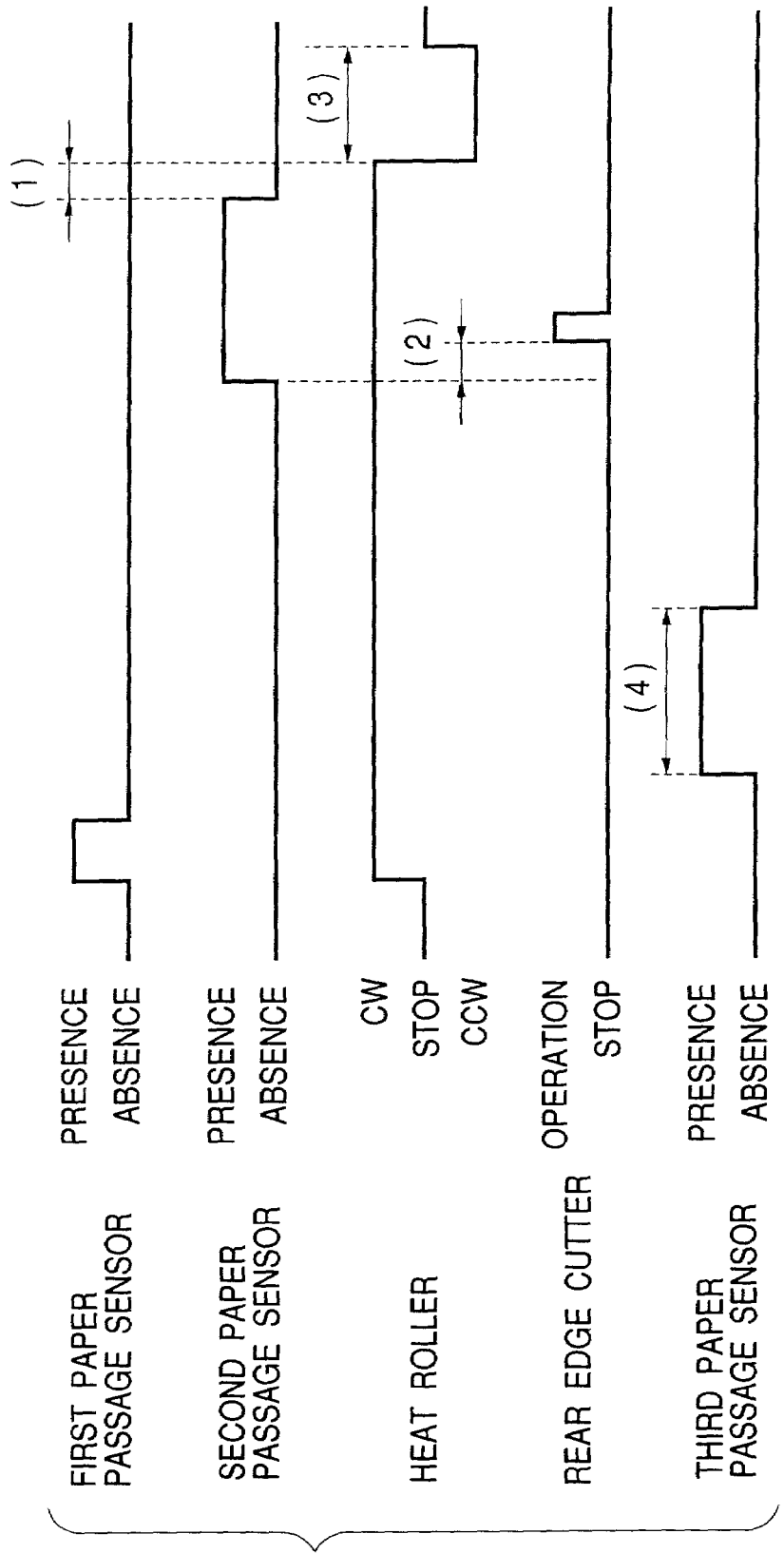
FIG. 8 is a view which shows the relationship between the driving pulses and the driving operation of each part when the laminating apparatus represented in FIG. 7 is automatically controlled.

FIG. 7 is a view showing the structural example of another apparatus to which the present invention is applicable. FIG. 8 shows the timing at which each operation of the units of the apparatus represented in FIG. 7 is controlled as detected by each of detection means in accordance with the driving pulses of each unit of thereof. The apparatus shown in FIG. 7 differs from the one shown in FIG. 1 in that a third paper passage sensor 15 is arranged between the heating and pressure roller and the rear edge cutter, and then, an additional structure is formed to detect the length of a printed object P to be carried. With the structure thus arranged, it becomes possible to apply laminating process to printed objects of various lengths unlike the apparatus shown in FIG. 1 which has a printed object of a fixed type as its target to be laminated.

In other words, it becomes possible to exactly calculate the carrying amount required for the rear edge cutting of a printed object P, and the carrying amount required for exhausting the printed object P from the laminating apparatus after the front edge cutting thereof per printed object in accordance with the detected length thereof by the third paper passage sensor 15. FIG. 8 is a chart in which a structure is added in order to detect the length of a printed object which should be detected by the third paper passage sensor 15 (indicated at 4 in parenthesis in FIG. 8).

In this chart, a reference numeral 4 in parenthesis indicates the rotational pulses of the roller 3 during a period in which the third paper passage sensor 15 detects the "presence" of the printed object. With this arrangement, it becomes possible to execute the operation of the rear edge cutting only at a timing in which the printed object is carried just by the pulse numbers designated by a reference numeral 2 in parenthesis which is obtained by subtracting the carrying pulses corresponding to the distance between the second paper passage sensor 13 and the rear edge cutter (assuming that the interval between the second paper passage sensor 13 and the rear edge cutter is constant) at the time of having detected the front edge of the printed object by the second paper passage sensor. Reference numbers 1 and 3 each in parenthesis are the same those described in conjunction with FIG. 4.

Here, the composition of a printed object to which the laminating process of the present invention is applicable is not particularly limited. However, the method of the invention is preferably applicable to the printed object which has been obtained by the image formation using the ink jet recording method on a recording medium having an ink receiving layer on the supporting element thereof. As the porous inorganic particles usable for the formation of the ink receiving layer of such a recording medium as this, silica, alumina, magnesium carbonate, mixed crystal of silica and alumina, mixed crystal of silica and magnesium, or the like can be used. Of these particles, it is most preferable to use silica from the economical point of view. Here, as silica, it may be possible to use the mizukasil P-50 or P-78 (Product name: manufactured by Mizusawa Kagaku K. K.) as the preferable silica particles.

Also, when the ink receiving layer is formed, binding material can be used as required. For example, it may be possible to utilize water soluble polymer, emulsion, such as polyvinyl alcohol, vinyl acetate, acryl. The compound ratio between porous inorganic particles and binding material may be selected from the range of 30 to 1000 weight portion of binding material or preferably 50 to 500 weight portion thereof to 100 weight portion of porous inorganic particles, for example. Further, it may be possible to add to an ink receiving layer a dispersion agent, a fluorescent dye, a pH adjuster, a lubricant, a surfactant, or various other adhesives as needed. The layer thickness of the ink receiving layer is preferably selective from a range of 30 to 60 μm, for example.

Meanwhile, the recording method for ink jet recording is not necessarily limited. The one that uses electrostatic suction, piezoelectric elements, or heat generating elements may be adoptable as the recording method therefor.

As ink used for the ink jet recording, any ink, such as the one having dyestuff, pigment, or some other coloring material contained in water medium, that may be applicable to the ink jet recording method is usable. When color recording is performed, full-color images can be formed by use of a normal method with a reduction color mixture using cyan, magenta, and yellow or, if necessary, black to be added as needed.

Also, as the member for laminating use, it is possible to adopt those composed variously, and there is no particular limit if only the one can form a transparent film layer on the surface of images formed on a printed object. For example, it may be composed with a laminating layer formed by providing a heat resistive base material with a single or multiple thermoplastic resin film layer or latex layer formed thereon. Here, when the latex layer is used for the laminating layer, a part of the laminated layer becomes a transparent film by heating.

As the heat resistive base material, any material may be usable if only the material can maintain a shape stably even in condition of being heated under pressure, and also, it can be peeled off easily from the laminated layer fixed to the surface of images. For example, a film, a sheet, or the like formed by such material as polyethylene telephthalate (PET), polyethylene naphthalate (PEN), polyphenylene sulfide (PPS) or polyether sulfone (PES) is usable, among some others. The thickness thereof may be the one suitable for the laminating process. For example, it may be selected from a range of 25 to 50 μm.

When the composition is arranged by use of latex layer, thermoplastic particles are fixed on the base material to form a layer in such a manner that the particles do not fall off from the base material easily. The material may be any one that may be able to form film when heated. As the formation material of this latex layer, there may be usable vinyl chloride vinyl acetate, styrene, acrylic latex, or the like.

For the formation of latex layer, it may be possible to form it by coating a coating solution that contains latex by use of the roll coating method, the rod-bar coating method, the spray coating method, the air-knife coating method, the slot die coating method, or the like, together with a drying process. The layer thickness of the latex layer thus obtained may be made anyway if only it can satisfy the desired quality of images when the laminated layer is formed on the surface of images on the printed object lastly in the form of a transparent film. For example, it may be 20 to 30 μm. If the latex layer should be formed multiply, it should be good enough to form a laminate layer in a layer thickness that may satisfy the image quality as a whole, and the layer thickness of the latex layer may be set as a whole as in the same manner as the formation of the single layer described above.

For example, in order to make the image quality more favorable, the thickness of the laminated layer formed on the surface of images should be 2 to 30 μm lastly, or more preferably, 5 to 10 μm.

First Embodiment

A coating solution is prepared by adding silica (product name: mizukasil P-50 manufactured by Mizusawa Kagaku K. K.) of 150 weight portion and polyvinyl alcohol (product name: Kuraray Poval PVA-235 manufactured by Kuraray K. K.) 100 weight portion so that the amount of solid content becomes 15 wt %, and then, dispersed to adjust the coating solution. This coating solution is applied as base material to a high quality paper sheet of 186 g/m² so that the film thickness becomes 50 μm after being dried. A recording medium is thus obtained after drying.

Also, meanwhile, as the heat resistive base material, acrylic emulsion (manufactured by Nisshin Kagaku K. K. 2706, Tg:15° C.) is coated on polyethylene telephthalate (PET) film of 38 μm thick and dried to make it in a film thickness of 10 μm. After drying, it is wound up as a roll to obtain the member for laminating use.

A roll of the member for laminating use thus obtained is mounted on the laminating apparatus shown in FIG. 1, and a printed object, which is obtained by performing ink jet recording on a recording medium which has been obtained as described above, is inserted into the laminating apparatus. Then, between the rollers 3 and 5, a laminating process is executed in condition: linear pressure, 7N/cm; carrying speed, 20 mm/sec, and heating temperature, 140° C. Further, a number of printed objects are produced. Then, with the rewinding carriage process is incorporated to execute a number of laminating processes one after another. As a result, it has been confirmed that laminating is obtainable in excellent condition, and that the member for laminating use can be utilized efficiently.

When a printed object is separated from a heat resistive base material after a laminated layer fixed to the surface of images on a printed object in the form of a transparent film by use of a laminating layer held on the heat resistive base material, only the portion of the laminated layer, which is solidified to be fixed on the surface of the images on the printed object, is automatically and effectively separated. In this manner, the laminating process becomes possible more efficiently without creating wasteful cut pieces. Further, it becomes possible to arrange the structure of apparatus simpler by automatically executing the peel off process from the member for laminating use after the laminated layer is solidified and fixed on the surface of images on the printed object. Then, furthermore, by means of the rewinding carriage process, it becomes possible to enhance the utilization efficiency of laminating the laminated layer to a printed object.

What is claimed is:

1. A laminating method for forming a laminated layer in the form of a transparent film on a surface of an image on a printed object, comprising the steps of:

transferring a laminate having a laminated layer and a heat resistive base material layer to the surface of the printed object for laminating to form a laminated printed object;

a rear edge peeling step of peeling off the heat resistive base material layer from a rear edge portion of the laminated printed object by exerting an active force on the rear edge of the laminated printed object;

a front edge peeling step of peeling off the heat resistive base material from a front edge portion of the printed object; and a finishing step of peeling off the heat resistive base material between the front edge and the rear edge of the laminated printed object, wherein said finishing step is performed after said rear edge peeling step and said front edge peeling step.

2. A laminating method according to claim 1, wherein a portion of the laminate transferred to the printed object is deformed to peel off the printed objected by a difference in deformation caused by a different firmness of the laminate and the printed object.

3. A laminating method according to claim 1, wherein the laminate is provided as a continuous sheet, and the printed object is supplied as a cut sheet to a specific portion of the continuous sheet.

4. A laminating method according to claim 1, wherein said rear edge peeling step is performed after said front edge peeling step.

5. A laminating method according to claim 1, wherein said front edge peeling step is performed after said rear edge peeling step.

* * * * *